D. H. MOORE.
AIRLESS VEHICLE TIRE.
APPLICATION FILED OCT. 12, 1916.
1,232,369. Patented July 3, 1917.
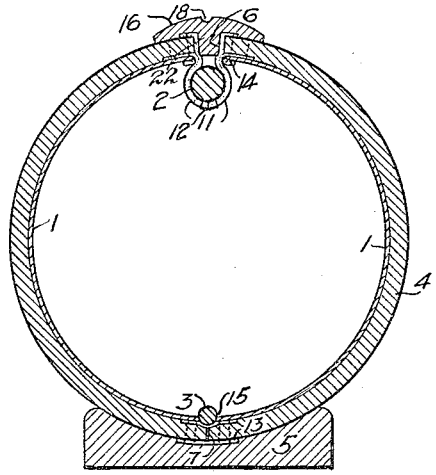
Fig. 1.
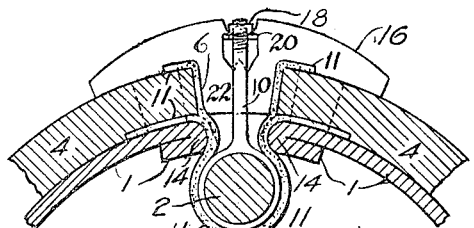
Fig. 2.
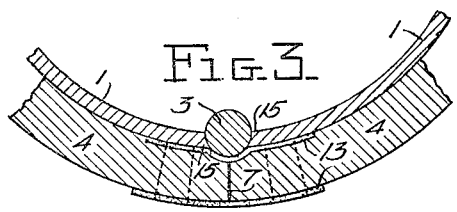
Fig. 3.
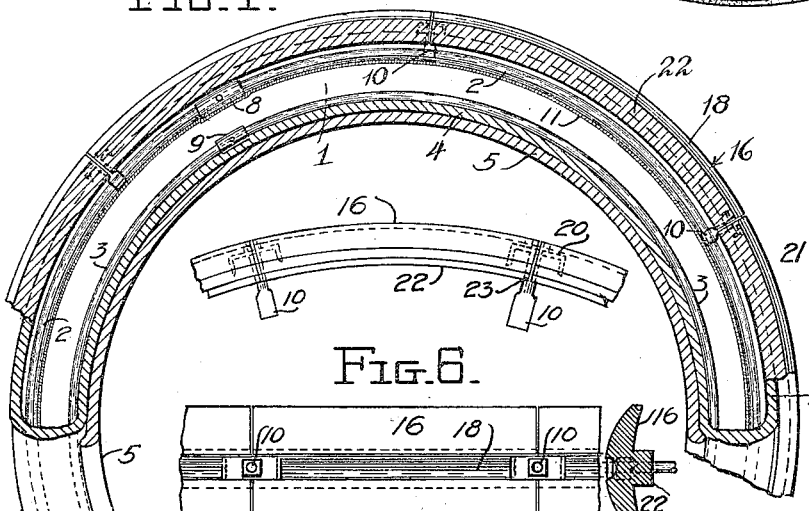
Fig. 4.
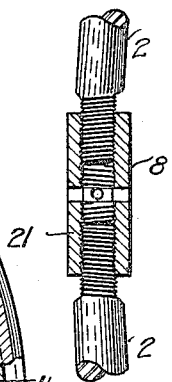
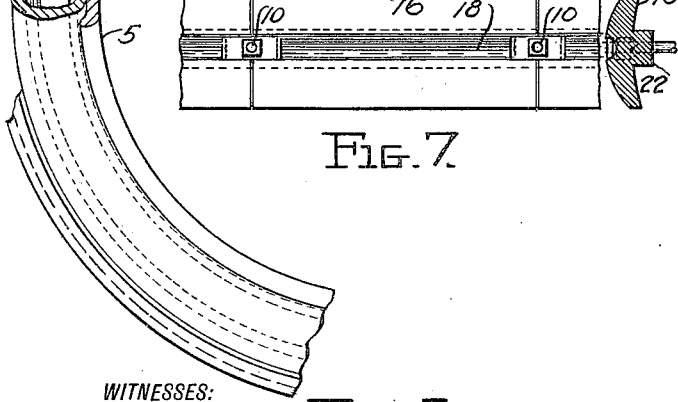
Fig. 6.
Fig. 7.
Fig. 5.
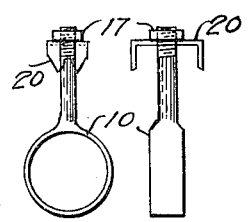
Fig. 8.
WITNESSES:
N. A. Lago
Clement O. Gittinger
INVENTOR
David H. Moore

UNITED STATES PATENT OFFICE.

DAVID H. MOORE, OF OKLAHOMA, OKLAHOMA.

AIRLESS VEHICLE-TIRE.

1,232,369.  Specification of Letters Patent.  Patented July 3, 1917.

Application filed October 12, 1916. Serial No. 125,322.

*To all whom it may concern:*

Be it known that I, DAVID H. MOORE, a citizen of the United States, residing at Oklahoma city, in the county of Oklahoma and State of Oklahoma, have invented an Airless Vehicle-Tire, of which the following is a specification.

My invention relates to improvements in vehicle tires utilizing an outer casing, but eliminating the inflated inner tube, and the object of my improvements are, first; to make use of old outer casings which are otherwise useless; second, to replace the inflated rubber inner tube with a steel inner tube made in two pieces, and third, to form an airless vehicle tire that is proof against puncture.

I attain these objects by the mechanism illustrated in the accompanying drawing in which Figure 1 is a cross section of the tire on a radial line; Fig. 2 an enlarged cross sectional view of the tread of the tire; Fig. 3 an enlarged cross sectional view of the tire next to the rim of the wheel; Fig. 5 an assembled view of the tire, with the upper part in section and Figs. 4, 6, 7, and 8, details of the various parts. Similar numbers and letters refer to similar parts throughout the several views.

The old outer casing designated by the numeral 4, is split along the tread, making two equal pieces; these pieces are sewed together at 13 by placing heavy pieces of canvas on both the inside and the outside, thus closing the opening 7 as made by the manufacturers. The other edges of the casing, where split on the tread, are protected by sewing strips of heavy canvas around the entire circumference of the tread, said strips 11, being wide enough to inclose the ½ inch round steel rod designated by the numeral 2, the meeting edges on the underside of the rod being provided with eyelets, through which are laced rawhide thongs 12. This lacing is done by bringing each strip up through gap 6 and on the outside of the casing. After lacing they are turned down through gap 6, thus forming a rest for rod 2.

The numeral 1 designates the steel inner tube ⅛ inch thick, made in two sections; the bottom of these sections bear against a ¼ inch round steel rod 3, which rests on the inside of the outer casing next to the rim 5 of the wheel at 7. The steel inner tube designated by the numeral 1, at the top, bears against the strips of canvas 11, just above the rod 2 at 14, thus tending to close the gap 6, made in the outer casing 4. At 14 the edges of the inner casing 1 are bent back, thus making a round bearing surface which prevents cutting of the canvas 11.

By means of a turnbuckle 8 on the rod 2 the rod can be tightened against the canvas 11 thus making close contact between the steel inner tube 1 and outer casing 4, thus tending to close the gap 6. The turnbuckle 8 is provided with four holes set ninety degrees apart for inserting a tool for adjusting the turnbuckle, thus changing the length of rod 2. The turnbuckle 8 can be reached through the gap 6 in the outer casing 4; the canvas strips 11 can be made of such width that, on tightening the rod 2, the inner tube 1 will be forced against the canvas 11 at 14. The rod 3 is also provided with a turnbuckle 9 by means of which the rod can be tightened.

In case it is desired to renew the wearing surface or tread of the tire, sections of solid rubber 16 may be inserted in the gap 6, which can be made any suitable width. By tightening the rod 2, the sides of the gap 6 can be made to firmly grip the tongue 22 of the rubber section 16. Each end of each section 16 is provided with a semicircular hole 23; an eyebolt 10, being placed on the rod 2, projects upward through the gap 6, and through the two semicircular holes where the ends of two sections 16 meet. A staple, 20, of suitable length, fits down over the bolt 10, and is pressed into the adjoining ends of the sections 16 by screwing down the nut 17, thus firmly securing the new tread in place. The last section to be inserted will be the one just above the turnbuckle 8 after the rod 2 is properly adjusted. These rubber sections 16 can be made of any suitable length, dependent upon the diameter of the wheel. A depression 18 along the center of the tread, as well as the ends of eyebolts 10 will prevent skidding.

The sections of the inner tube 1 bear against the rod 3 adjacent the rim of the wheel, and over the rod 2 adjacent the tread, and thus the tire is firmly braced.

The herein described tire is comparatively light and is not subject to punctures, etc., which is common with the pneumatic tire.

It will be seen from the foregoing description that an efficient, durable and puncture proof inner tube is provided, and although a particular construction is shown and described, it is to be understood that I am not limited to such particular construction but may make such changes as fall within the scope of the claim hereunto appended.

Having thus fully described my invention, what I claim as new is—

In combination, a tire casing and a metallic inner tube, said casing and tube being jointly provided with a longitudinal slit in the outer periphery thereof, fabric strips having their opposite edges secured to the margins of the casing adjacent the slit, and having their adjacent edges secured together, said fabric strips forming a channel in the outer periphery of the casing, a steel rod disposed in said channel, and means for tightening said rod for drawing the margins of the tube into close contact with said fabric strips.

DAVID H. MOORE.

Witnesses:
 CLEMENT O. GITTINGER,
 N. A. LAGO.

Copies of this patent may be obtained for five cents each, by addressing the "Commissioner of Patents, Washington, D. C."